United States Patent [19]
Farneth et al.

[11] Patent Number: 6,086,668
[45] Date of Patent: Jul. 11, 2000

[54] UNIFORMLY COATED PARTICULATE METAL OXIDE

[75] Inventors: William Edwin Farneth, Wilmington; Norman Herron, Newark, both of Del.

[73] Assignee: E. I. du Pont de Nemours and Company, Wilmington, Del.

[21] Appl. No.: 09/165,597

[22] Filed: Oct. 2, 1998

Related U.S. Application Data

[60] Provisional application No. 60/061,339, Oct. 8, 1997.

[51] Int. Cl.$^7$ .............. C09C 1/00; C09C 1/28; C09C 1/36; C09C 1/40
[52] U.S. Cl. .......... 106/442; 106/403; 106/436; 106/438; 106/445; 106/446; 106/450; 106/481; 106/482; 106/483; 106/490
[58] Field of Search ............ 106/442, 403, 106/436, 438, 445, 446, 450, 481, 482, 483, 490

[56] References Cited

U.S. PATENT DOCUMENTS

| | | | |
|---|---|---|---|
| 2,885,366 | 5/1959 | Iler | 252/313 |
| 5,145,719 | 9/1992 | Towata et al. | 427/215 |
| 5,246,734 | 9/1993 | Varaprath et al. | 427/166 |
| 5,424,129 | 6/1995 | Lewis et al. | 428/403 |
| 5,562,897 | 10/1996 | Mitchnick et al. | 424/59 |
| 5,650,002 | 7/1997 | Bolt | 106/438 |
| 5,653,794 | 8/1997 | Weber et al. | 106/442 |
| 5,753,025 | 5/1998 | Bettler et al. | 106/442 |
| 5,851,652 | 12/1998 | Jacobson et al. | 106/442 |
| 5,886,069 | 3/1999 | Bolt | 523/223 |
| 5,922,120 | 7/1999 | Subramanian et al. | 106/442 |

FOREIGN PATENT DOCUMENTS

| | | | |
|---|---|---|---|
| 1 186 185 | 4/1985 | Canada | 106/442 |
| 3-265668 | 11/1991 | Japan | 106/442 |
| 96/36441 | 11/1996 | WIPO | B05D 7/00 |

OTHER PUBLICATIONS

Okuhara, T. et al, Preparation of $SiO_2$ Overlayers on Oxide Substrates By Chemical Vapor Deposition of $Si(OC_2H_5)_4$, *Applied Surface Science*, 29, 223–241, 1987 (no month).

Gamble, Lara et al., Interaction of Silane Coupling Agents with the $TiO_2(110)$ Surface, *Langmuir*, 11, No. 11, 4505–4514, 1995 (no month).

Harvey, Paul R. et al., Photocatalytic Oxidation of Liquid Propan–2–ol by Titanium Dioxide, *J. Chem. Soc., Faraday Trans. 1*, 79, 1381–1390, 1983 (no month).

Wirth, Mary J. et al., Mixed Self–Assembled Monolayers in Chemical Separations, *Science*, 275, 44–47, 1997 (no month).

Powell, Quint H. et al., Synthesis of Alumina– and Alumina/Silica–Coated Titania Particles in an Aerosol Flow Reactor, *Chem. Mater.*, 9, No. 3, 685–693, 1997 (no month).

*Primary Examiner*—Anthony Green

[57] ABSTRACT

Metal oxide particles having a substantial uniform and homogeneous (across-particle) coating of a metal oxide or organofunctionalized metal oxide are disclosed and are prepared by hydrolysis of a monomeric precursor to the coating.

2 Claims, 3 Drawing Sheets

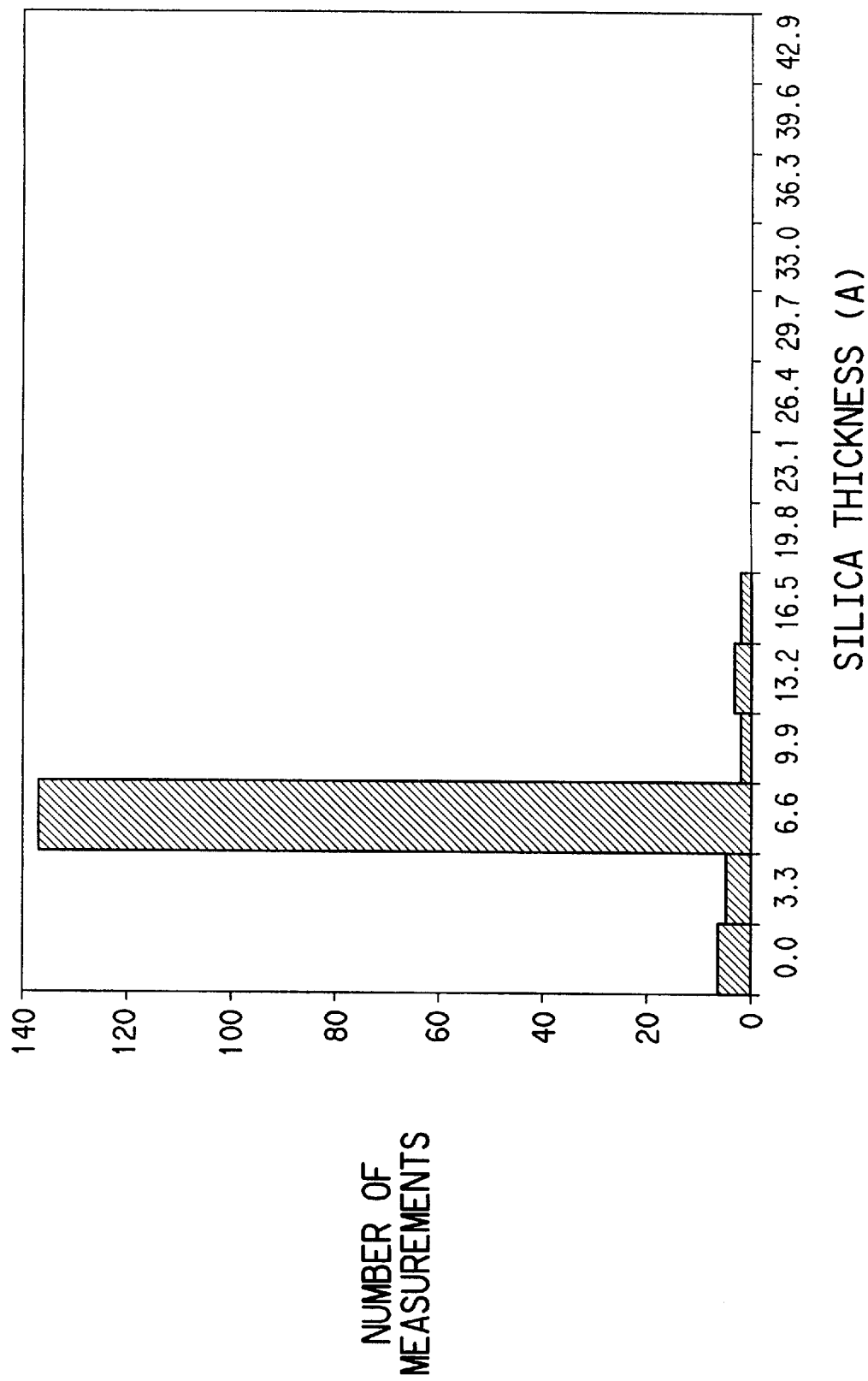

UNIFORMLY COATED PARTICULATE METAL OXIDE

This application claims benefit of Provisional Application No. 60/061,339, filed Oct. 8, 1997.

BACKGROUND OF THE INVENTION

This invention relates to metal oxide and/or organofunctionalized metal oxide coated metal oxide particles, where the two metals are not the same. Such materials are obtained by reaction of the pre-formed particles with a monomeric precursor to the coating, and characterized by extremely high levels of uniformity in coating thickness over both the surface of individual particles and the particle population.

In many applications using titania particles as a white pigment, the lifetime of the pigmented material, paints or plastics for example, is reduced by chemical processes initiated by photo-excitation of the pigment particles. As a result, technologies to improve the durability of pigmented objects have been developed which suppress the photocatalytic activity of titania pigments. The most successful approach to this problem has been coating the particles with silica or silica/alumina layers. Pigments with silica coatings at 1.5–2.0 weight % are characterized as "durable" pigments, and at 5–6 weight % are described as "high durability" pigments.

These efforts to reduce photocatalytic activity of titania pigments are not without disadvantages. First, pigment gloss degrades rapidly with added silica. High gloss and durability are therefore difficult to attain simultaneously in products based on this approach. Second, titania particles with pure silica surfaces do not disperse well in many of the vehicles in which pigments are used. This requires additional surface treatments, typically involving deposition of partially crystalline alumina layers. Therefore, other methods for suppressing the inherent photoactivity of pigment particles are of interest, either to minimize the severity of the tradeoffs in the properties of the finished pigment, or to confer cost or flexibility advantages in new manufacturing production facilities.

SUMMARY OF THE INVENTION

The present invention discloses a process for preparing metal oxide particles having a substantially uniform coating, the process comprising the steps of reacting a plurality of metal oxide particles with at least one precursor selected from the group consisting of monomeric metal oxide precursors and organofunctionalized metal oxide precursors, wherein the monomeric metal oxide precursors are selected from the group consisting of tetraalkoxysilane; $SiCl_4$; Al(i-propoxide)$_2$(acetoacetate); and Zr(alkoxide)$_4$; and wherein the organofunctionalized metal oxide precursors are selected from the group consisting of n-alkylalkoxysilane, wherein the n-alkyl is $C_1$–$C_{16}$ and the alkoxy is $C_1$–$C_6$; n-alkyltrichlorosilane wherein the n-alkyl is $C_1$–$C_{16}$; and n-alkyltrialkoxysilane wherein the n-alkyl is $C_1$–$C_{16}$ and the alkoxy is $C_1$–$C_6$; with the proviso that the metal oxide of the coating is different from the metal oxide of the particles.

BRIEF DESCRIPTION OF THE DRAWING

FIG. 1a is a histogram of the coating thickness distribution obtained from analysis of transmission electron microscopy images of a representative sample of the uniformly coated (at 0.68 wt % $SiO_2$) metal oxide particles of this invention using tetraethylorthosilicate as an $SiO_2$ precursor.

DETAILED DESCRIPTION OF THE EMBODIMENTS

Figure 1B:
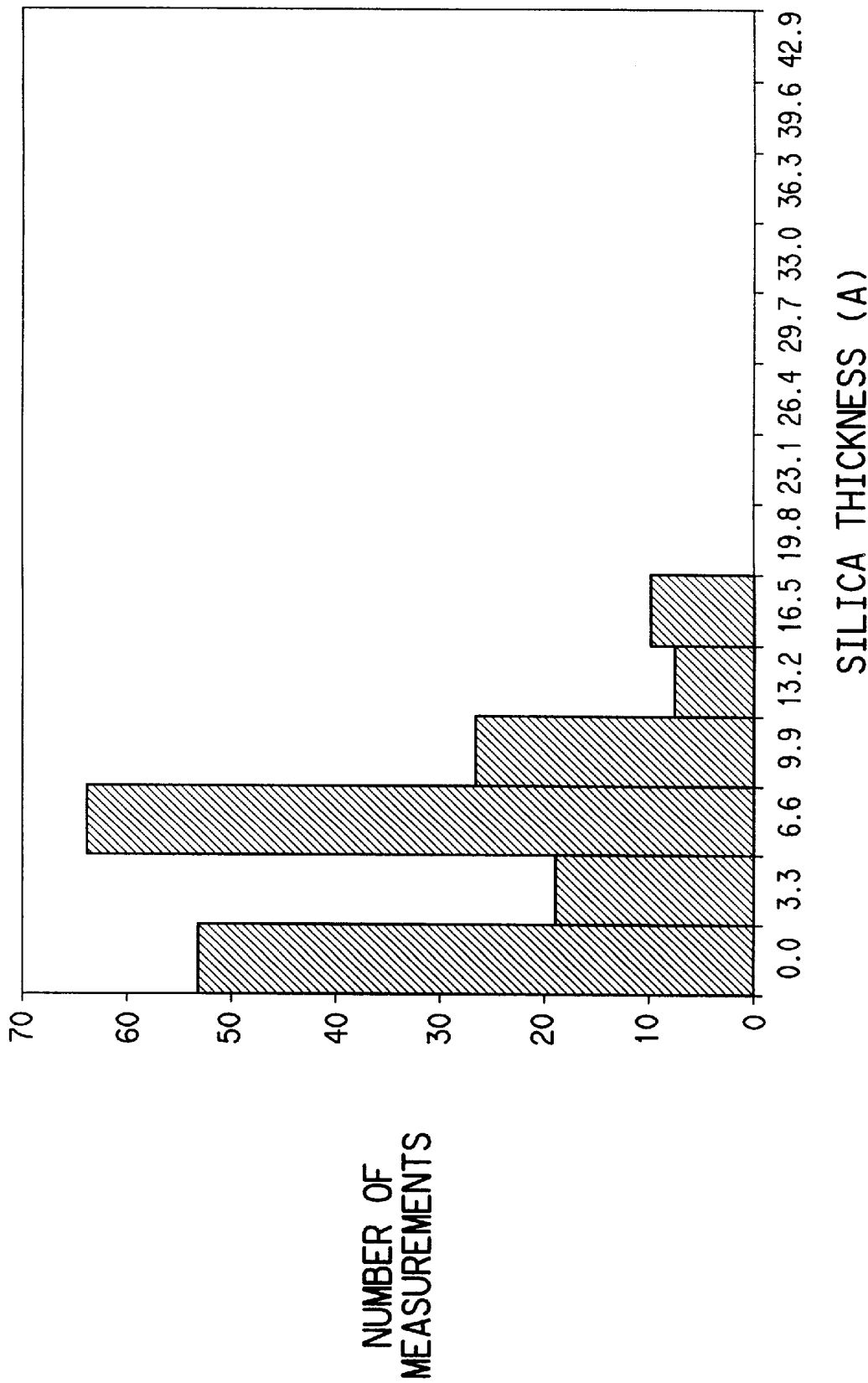
FIG. 1b is a histogram of the coating thickness distribution obtained from analysis of transmission electron microscopy images of a representative sample of coated (at 0.52 wt % $SiO_2$) metal oxide particles produced using a sodium silicate solution as the $SiO_2$ precursor in accordance with U.S. Pat. No. 2,885,366.
Figure 2:
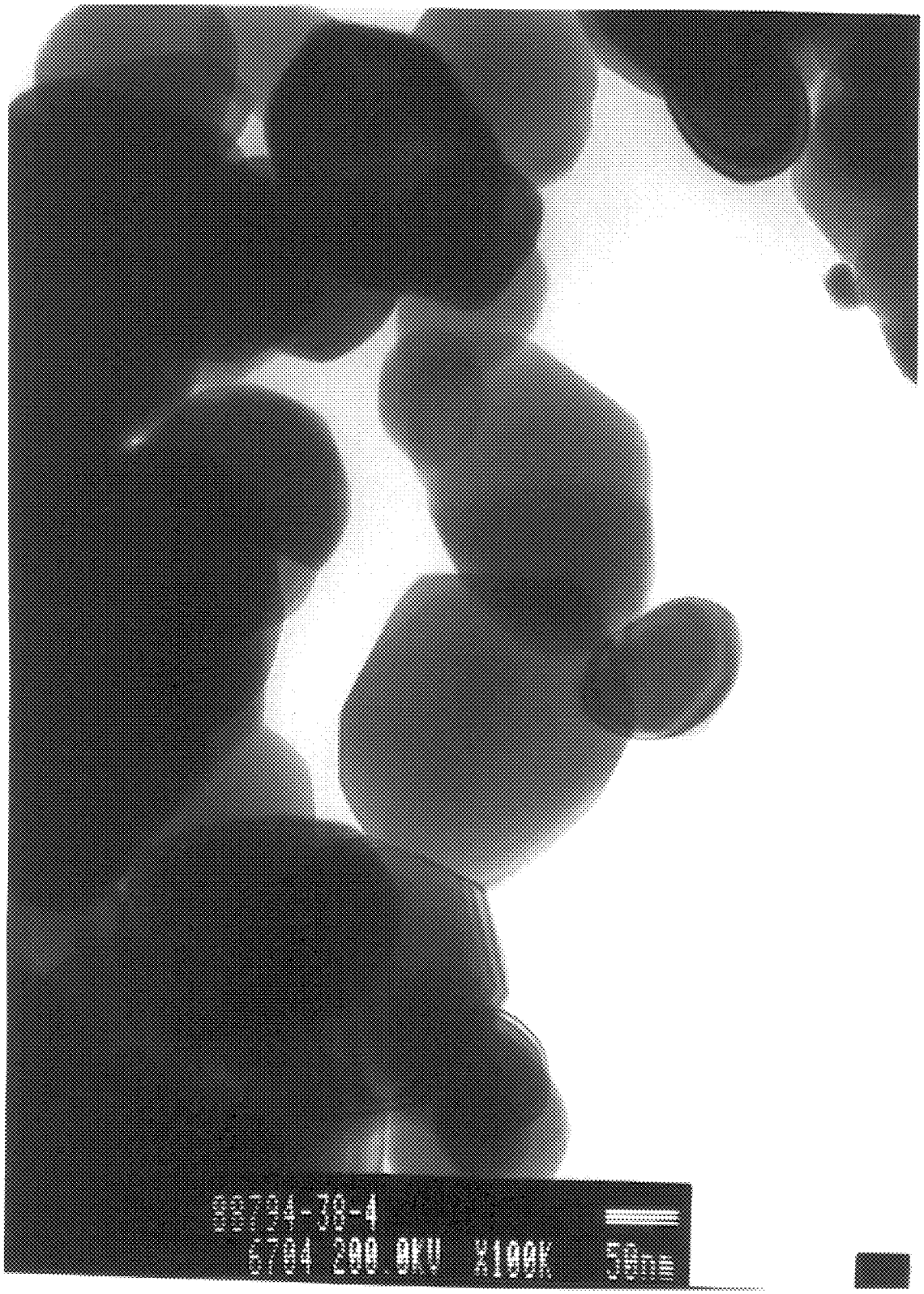
FIG. 2 is a transmission electron micrograph (TEM) image of a $TiO_2$ sample of this invention having a silica coating of approximately 2% by weight, particularly illustrating the substantially uniform coating of a particle and among particles.

As part of our investigation of the photocatalytic chemistry of $TiO_2$ pigment particles we have prepared and characterized samples of coated particles that are extremely uniform in microstructure. In contrast to the traditional routes for coating pigments which use colloidal precursors to metal oxides, these coatings are applied using monomeric precursors to a metal oxide, for example, tetraethylorthosilicate (TEOS), as a silica ($SiO_2$) precursor. At the same weight % silica, these particle coatings are distributed much more uniformly than in the conventional coated pigments. For example, using transmission electron microscopy we can demonstrate that with 0.5–0.7 weight % silica deposited onto the particle population, over 90% of the particles have a coherent surface coating. Furthermore, the coating can be described with a thickness probability distribution that closely approximates a delta function with a significant population only at the thickness that would be expected if the measured weight percentage of silica were uniformly distributed over the entire sample's surface area. This stands in marked contrast to the best laboratory-produced coatings from polymeric silicate precursors, where more than 50% of the particles are partially uncoated at this weight % silica, and for which the thickness probability distribution approximates a Gaussian function with a mean near the expected thickness for uniformly applied amorphous silica, and a standard deviation roughly equal to half the mean. The high degree of coating uniformity in these materials has value in pigmentary applications. It leads to an improvement in the efficiency of silica utilization for photoactivity suppression. It is expected to enable the preparation of pigments that combine high gloss and high durability. It results in pigments that show more uniform behavior in subsequent processing steps.

In the second aspect of the invention, metal oxide particles are coated via reaction of monomeric oxide precursors with the surface of preformed metal oxide particles, especially silica deposited onto titania. Simply speaking the process comprises the step reacting a monomeric precursor with the particle in the presence of water in an amount sufficient to hydrolyze the precursor. First a metal oxide particle sample is wetted by adding water in an amount sufficient to stoichiometrically hydrolyze the oxide coating precursor. Some of this water may also be present simply by the natural adsorption of water vapor from humid air in which case it may be defined by a TGA analysis. The dampened metal oxide particles are then exposed to one or more monomeric metal oxide and/or functionalized metal oxide precursors. Such precursor is typically slurried into an inert organic solvent carrier such as toluene, hexane etc. in which it is completely soluble/miscible. The slurry of the damp titania in the precursor solution is then allowed to react, under moderate heating (reflux of solvent vehicle) and with excellent mixing for ~4 hours so as to allow adequate time for the hydrolysis reaction between the precursor molecules, the particle surface and the adsorbed water to reach completion. The sample is then filtered, washed and dried over flowing air to recover the coated metal oxide particles.

Examples of monomeric metal oxide precursors that may be used to advantage include TEOS, tetramethylorthosilicate (TMOS), $SiCl_4$, $Al(i-propoxide)_2(acetoacetate)$, $Zr(alkoxide)_4$, etc. Examples of organofunctionalized metal oxide precursors include n-alkyltrialkoxysilanes where the n-alkyl is $C_1$–$C_{16}$ and the alkoxy is $C_1$–$C_6$; (e.g., methyltriethoxysilane, ethyltriethoxysilane octyltriethoxysilane, etc.); and $C_1$–$C_{16}$ alkyltrichlorosilanes.

Examination of the photoactivity, particle morphology and chemical analysis of the resulting particles indicate a high level of control over the resulting coating morphology in terms of uniform thickness and excellent particle to particle homogeneity. The control of water content and monomeric reagent quantity added to the original particle dictates the final coating thickness, etc.

EXAMPLE 2 g of pyrogenic $TiO_2$ was placed in a small round-bottom flask and 8 microliters of water was added by syringe. The damp $TiO_2$ was then tumbled thoroughly for 30 minutes at room temperature and atmospheric pressure so as to uniformly disperse the water over the $TiO_2$ surface. The flask was taken into an inert atmosphere glove box and 2 mL toluene containing 0.07 g tetraethylorthosilicate (TEOS) was added. The flask was attached to a rotary evaporator and the system was freeze-pump-thawed to evacuate. The flask, with slurry, was then tumbled under static vacuum at 100° C. (oil bath heater) for 4 hours. At the end of the time, 25 mL ethanol was added and the resulting slurry was filtered, washed with another 100 mL ethanol, then 25 mL water and finally 25 mL acetone. The solid was then suction dried before drying in flowing air at 80° C. for 1 hour.

The recovered dry solid was analyzed for silicon by x-ray fluorescence. The sample contained 0.58 weight percent Si as $SiO_2$. A histogram of the coating thickness distribution obtained from analysis of transmission electron microscopy images of a representative sample prepared by this method is shown in FIG. 1a. A comparison of FIG. 1a with FIG. 1b shows that the compositions of the present invention have substantially more uniform coatings on the surfaces of the individual particles and among particles in the composition.

Photo-oxidation of 2-propanol.

10 mg of $TiO_2$ powder is placed in a test tube containing a magnetic stir bar. 2 mL of an 0.40M solution of 2-propanol in pentane [containing 0.01M cis/trans decalin as an internal standard] is added. The test tube is sealed by attaching a stopcock and a vacuum adapter using a Viton® "o ring" and a pinch clamp. The solution is irradiated with continuous stirring for 2 hours at a fixed distance from a medium pressure Hg lamp contained inside a Pyrex immersion well. Standard samples are irradiated simultaneously and identically to assure run-to-run reproducibility. Conversion of 2-propanol to acetone is determined by gas chromatography. See generally, P. R. Harvey, R. Rudham and S. Ward; *J. Chem. Soc., Faraday Trans*, 1, 1983, 79, pp. 1381–1390.

Results are reported in Table 1. For comparison purposes, the photoactivity of uncoated $TiO_2$ pigment, R902 grade "durable" pigment (available from DuPont), and $TiO_2$ pigment coated at the same weight percent silica by the sodium silicate solution method are also reported.

TABLE 1

| Sample Identification | Photoactivity |
| --- | --- |
| Uncoated TiO2 | 14.3 |
| Coated $TiO_2$ (Sodium Silicate Method) | 7–10 |
| DuPont R902 durable pigment | 1.0 |
| Coated $TiO_2$ (Inventive Method) | 1.7 |

The difference in photoactivity at the same weight percent silica can be ascribed to the more uniform surface coverage obtained from the present invention. The particles of the present invention are comparable to commercial "durable" pigments in photoactivity, but comprise a lower weight percent silica and thus have higher gloss. In addition, at lower weight percent silica, the raw material costs to produce these pigments is lower as compared to commercially available durable pigments.

What is claimed is:

1. A process for preparing metal oxide particles having a substantially uniform coating, the process comprising the steps of reacting a plurality of metal oxide particles with at least one precursor selected from the group consisting of monomeric metal oxide precursors and organofunctionalized metal oxide precursors, wherein the monomeric metal oxide precursors are selected from the group consisting of tetraalkoxysilane; $SiCl_4$; $Al(i-propoxide)_2(acetoacetate)$; and $Zr(alkoxide)_4$; and wherein the organofunctionalized metal oxide precursors are selected from the group consisting of n-alkylalkoxysilane, wherein the n-alkyl is $C_1$–$C_{16}$ and the alkoxy is $C_1$–$C_6$; n-alkyltrichlorosilane wherein the n-alkyl is $C_1$–$C_{16}$; and n-alkyltrialkoxysilane wherein the n-alkyl is $C_1$–$C_{16}$ and the alkoxy is $C_1$–$C_6$, with the proviso that the metal oxide of the coating is different from the metal oxide of the particles.

2. A process for preparing metal oxide particles having a substantially uniform coating, with the proviso that the metal oxide of the coating is different from the metal oxide of the particles, said process comprising:

(a) wetting a plurality of metal oxide particles by adding water in an amount sufficient to hydrolyze at least one precursor selected from the group consisting of monomeric metal oxide precursors and organofunctionalized metal oxide precursors wherein the monomeric metal oxide precursors are selected from the group consisting of tetraalkoxysilane, $SiCl_4$, $Al(i-propoxide)_2$ (acetoacetate), and $Zr(alkoxide)_4$ and wherein the organofunctionalized metal oxide precursors are selected from the group consisting of n-alkylalkoxysilane wherein the n-alkyl is $C_1$–$C_{16}$ and the alkoxy is $C_1$–$C_6$; n-alkyltrichlorosilane wherein the n-alkyl is $C_1$–$C_{16}$; and n-alkyltrialkoxysilane wherein the n-alkyl is $C_1$–$C_{16}$ and the alkoxy is $C_1$–$C_6$;

(b) preparing a slurry of the wetted metal oxide particles and the precursor in a solvent in which the precursor is completely soluble or miscible; and (c) maintaining the slurry under moderate heat or reflux conditions until the hydrolysis of the precursor is complete.

* * * * *